(12) United States Patent
Patton

(10) Patent No.: US 7,869,195 B1
(45) Date of Patent: Jan. 11, 2011

(54) INTEGRATED PERSONAL MEDIA PLAYER AND PORTABLE DVD/CD PLAYER

(76) Inventor: Michael A. Patton, 135 S. Menard Ave., Chicago, IL (US) 60644-3937

( * ) Notice: Subject to any disclaimer, the term of this patent is extended or adjusted under 35 U.S.C. 154(b) by 1294 days.

(21) Appl. No.: 11/372,950

(22) Filed: Mar. 9, 2006

(51) Int. Cl.
*H05K 5/00* (2006.01)
*H05K 7/00* (2006.01)
*H04R 1/02* (2006.01)
*H04R 9/06* (2006.01)

(52) U.S. Cl. .......................... 361/679.01; 361/679.55; 361/679.56; 381/333; 381/334; 381/335

(58) Field of Classification Search ............ 361/679.55, 361/679.56, 679.01; 381/334, 335, 333
See application file for complete search history.

(56) References Cited

U.S. PATENT DOCUMENTS

| | | | |
|---|---|---|---|
| 6,678,892 B1 | 1/2004 | Lavelle et al. | |
| 6,697,032 B2* | 2/2004 | Chitturi et al. | 345/168 |
| 6,697,251 B1* | 2/2004 | Aisenberg | 361/679.09 |
| 7,580,254 B2* | 8/2009 | Anderson | 361/679.41 |
| 7,719,830 B2* | 5/2010 | Howarth et al. | 361/679.41 |
| 2003/0171834 A1 | 9/2003 | Silvester | |
| 2003/0233509 A1 | 12/2003 | Chang | |
| 2004/0047618 A1 | 3/2004 | Chen | |
| 2004/0162029 A1 | 8/2004 | Grady | |
| 2004/0175098 A1 | 9/2004 | Calhoon et al. | |
| 2004/0198436 A1 | 10/2004 | Alden | |
| 2004/0224638 A1 | 11/2004 | Fadell et al. | |
| 2004/0267390 A1 | 12/2004 | Ben-Yaacov et al. | |
| 2004/0268005 A1* | 12/2004 | Dickie | 710/303 |
| 2005/0027385 A1 | 2/2005 | Yueh | |
| 2005/0053365 A1 | 3/2005 | Adams et al. | |
| 2005/0117885 A1 | 6/2005 | Lee et al. | |
| 2005/0123147 A1 | 6/2005 | Everett et al. | |
| 2005/0135792 A1 | 6/2005 | Han | |
| 2005/0181756 A1 | 8/2005 | Lin | |
| 2005/0270949 A1 | 12/2005 | Han et al. | |
| 2006/0015808 A1 | 1/2006 | Shiozawa et al. | |

* cited by examiner

*Primary Examiner*—Jayprakash N Gandhi
*Assistant Examiner*—Anthony M Haughton
(74) *Attorney, Agent, or Firm*—Wildman, Harrold, Allen & Dixon LLP

(57) ABSTRACT

A personal, portable media player capable of receiving and storing audio and video programming is adapted for coupling via a docking system to a portable Digital Versatile Disc (DVD) and Compact Disc (CD) player for playing and recording of video and audio programming. The docking system is integrated in the housing of the DVD/CD player and is adapted for receiving the media player and allowing video and audio data received by or stored in the media player to be presented on or stored in the DVD/CD player. When connected via the docking system to the portable DVD/CD player, the media player is disposed in a recessed portion of the DVD/CD player's housing and is further protected by a transparent, removable cover connected to the housing and having an aperture therein to permit the user to provide selection/control inputs to the media player when connected to the DVD/CD player.

9 Claims, 5 Drawing Sheets

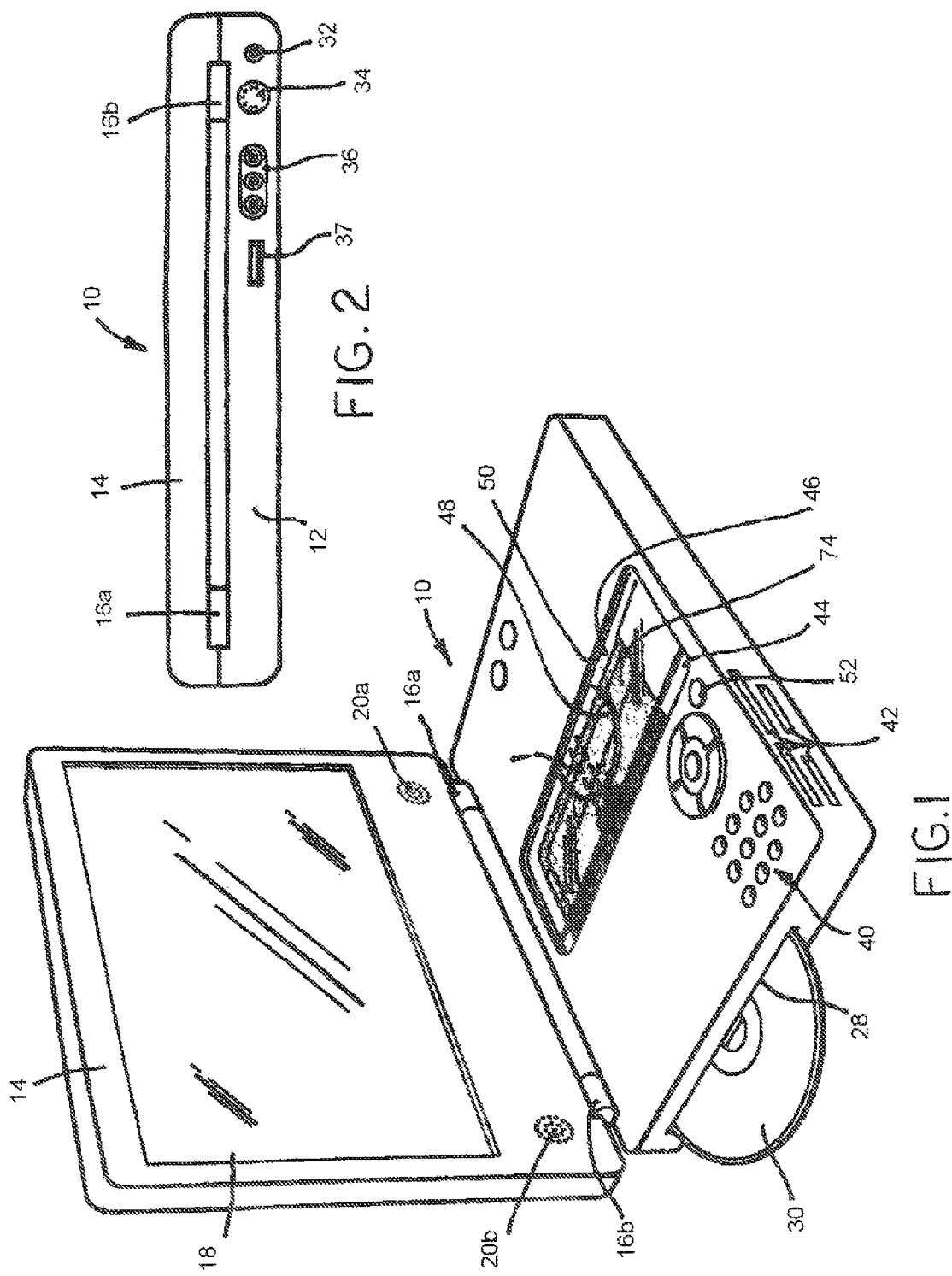

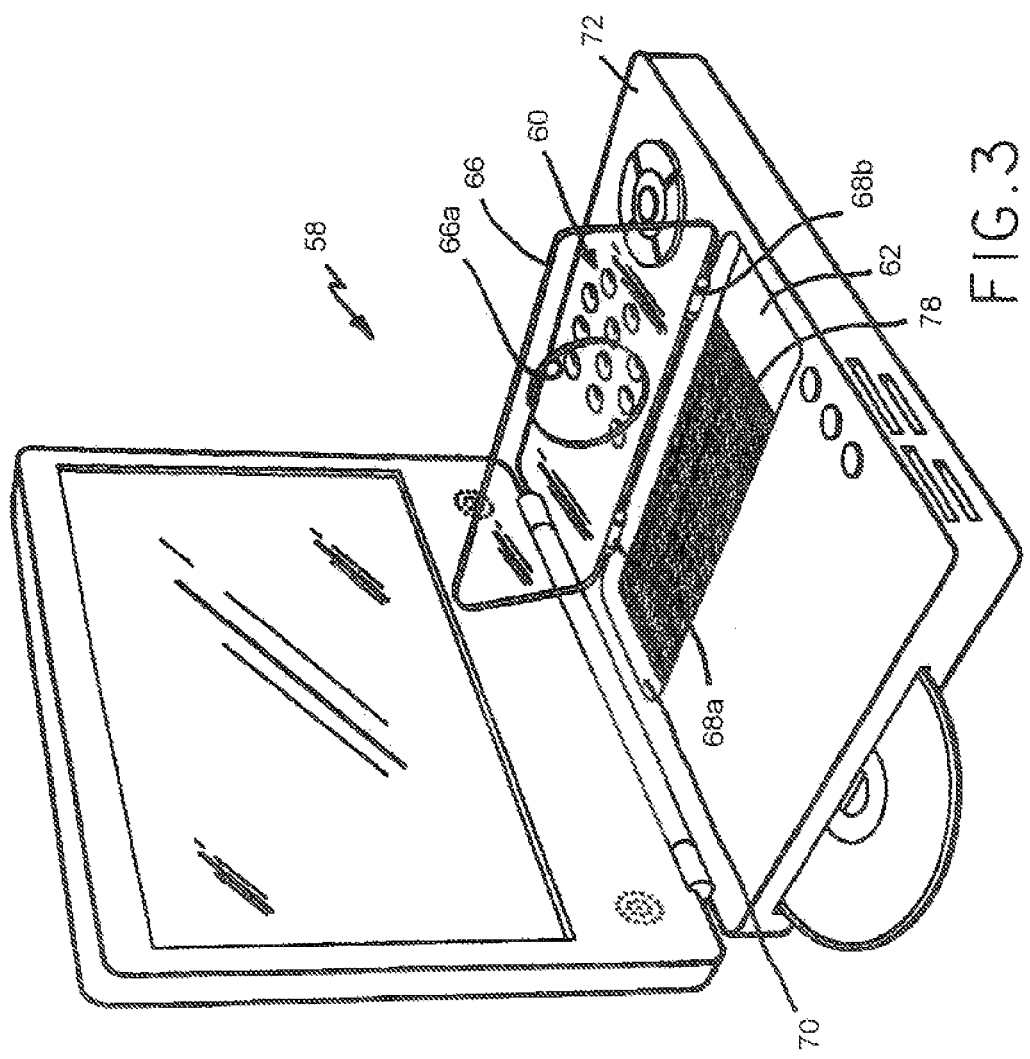

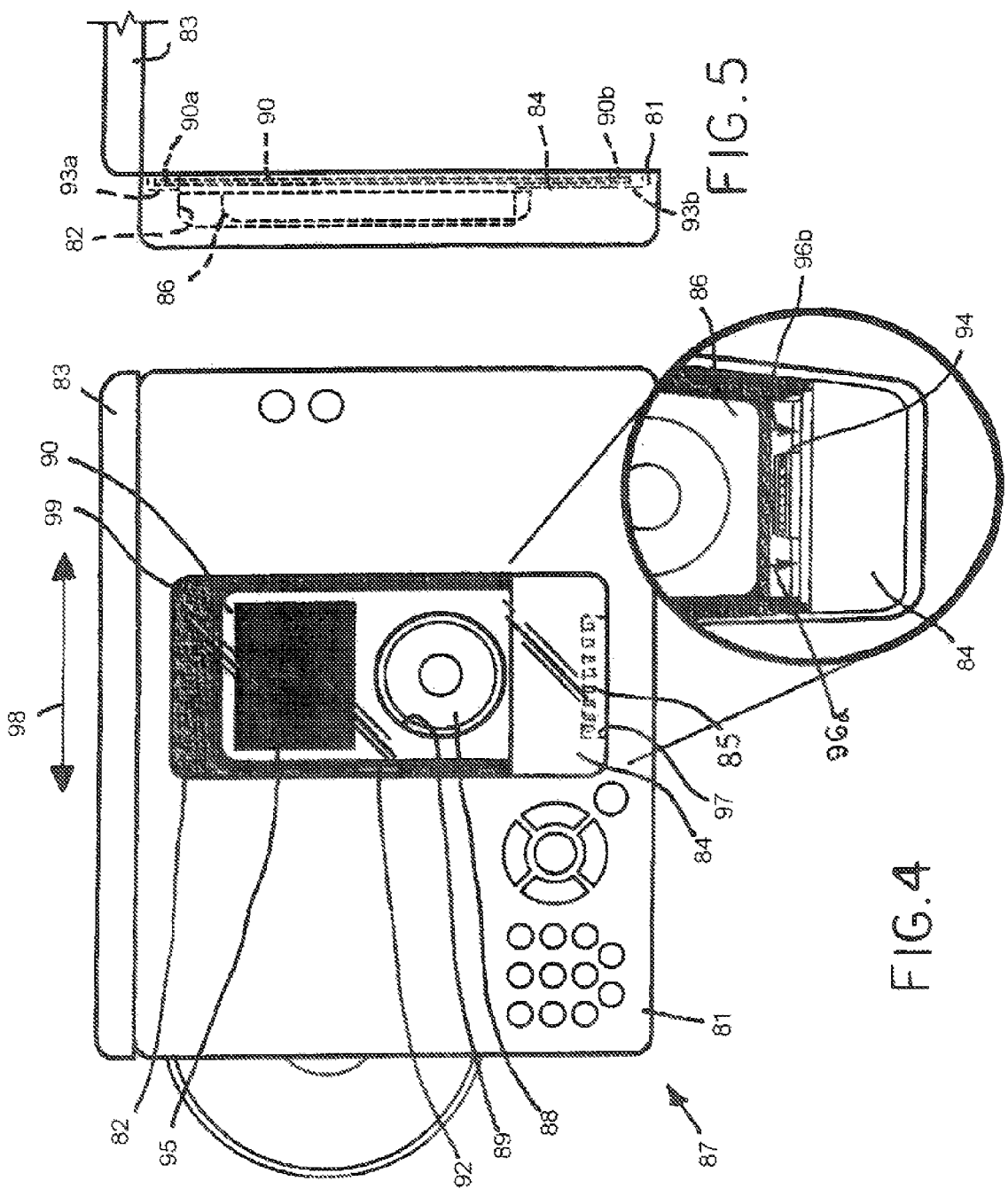

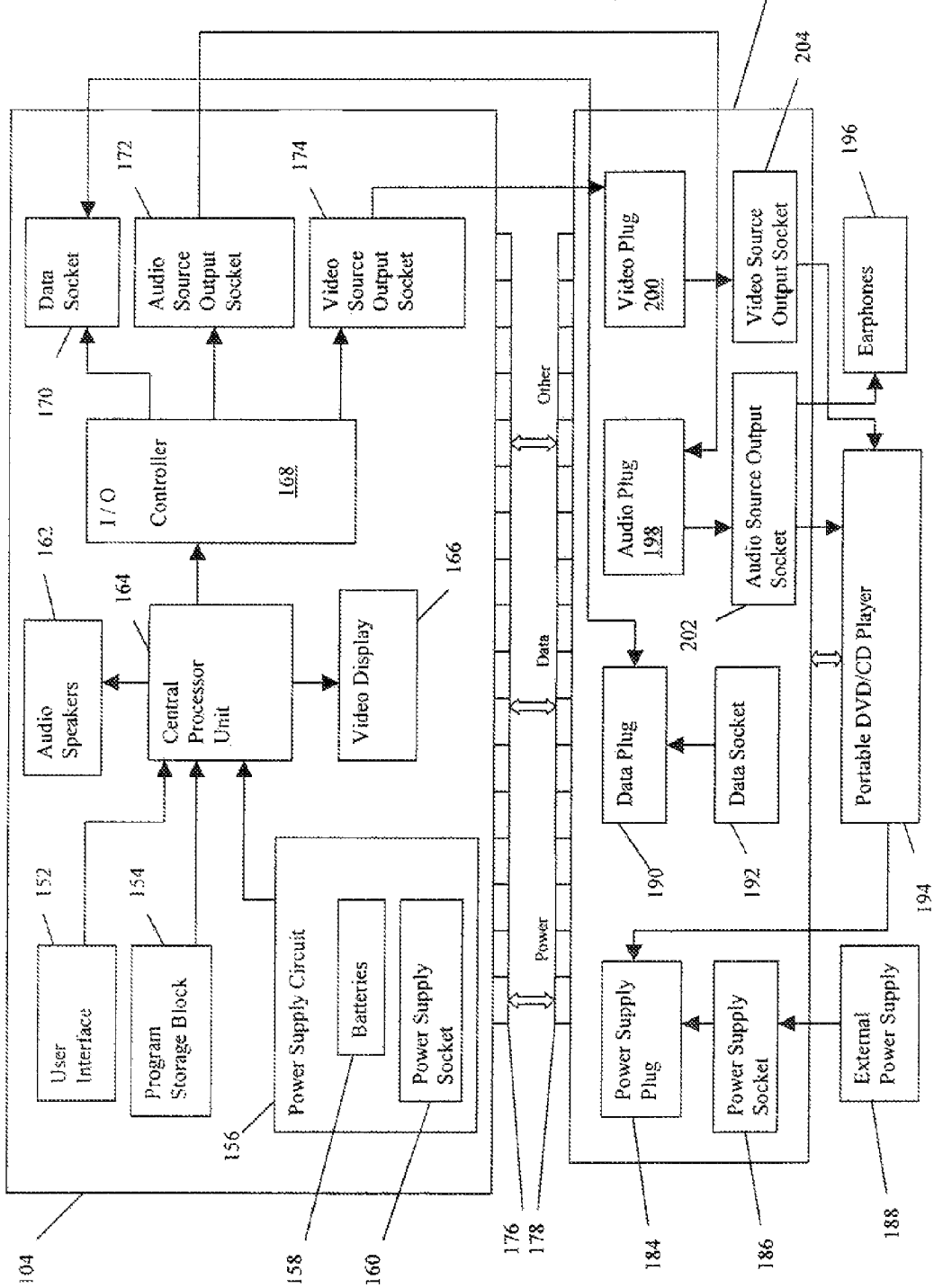

INTEGRATED PERSONAL MEDIA PLAYER AND PORTABLE DVD/CD PLAYER

FIELD OF THE INVENTION

This invention relates generally to entertainment in the form of video and audio recordings and programming and is particularly directed to the combination of a portable media player and a portable DVD/CD player for storing or presenting programming received by or stored in the portable media player on the portable DVD/CD player.

BACKGROUND OF THE INVENTION

There are many types of portable entertainment devices available to the consumer today. Among the more popular portable entertainment devices are Digital Versatile Disc (DVD) and Compact Disc (CD) players. DVD and CD players are so popular that they have been incorporated in notebook computers. These portable DVD/CD entertainment devices are often used in vehicles where one or more video displays may provide selected programming for individual vehicle passengers. The typical portable DVD/CD player is not only capable of playing DVDs and CDs having a variety of video and music formats, but is also capable of recording video and audio programming. These types of portable entertainment devices are increasingly provided with high quality video displays as well as high performance audio reproduction and speaker systems. However, the video and audio programming available on these portable entertainment devices is limited to the DVDs and CDs in the possession of the user.

Portable entertainment devices also take the form of digital music players, which are sometimes referred to as personal media players. One common form of a personal media player is the small-sized MP3 (MPEG Audio Player-3) player which can be used either as a stand alone device or integrated with another portable device such as personal digital assistants (PDAs) and cellular phones. Users of these types of personal media players typically collect and store a personal library of digital songs, which may be stored on memory units such as hard disc drives and removable memory cards such as of the flash-type. These types of digital libraries are typically acquired by the user via subscription services through the Internet, by multiple user exchanges, or by downloading songs from a compact disc and storing them in an MP3 library. The size of the memories used in these personal media players allows very large numbers of musical performances to be stored and easily accessed by a listener.

These types of personal media players originally were limited to use with and storage of digital music. Current models of these types of personal media players are also capable of displaying and storing video files and programming. As in the case of the earlier personal media players in which audio files and programming could be stored, the latter models of personal media players are adapted for connection to a computer for downloading and storing video files and programming. The small size of these personal media players places corresponding restrictions on the size of its video display limiting viewing to only the user of the device. In addition, the size limitations of the personal media player also limits the quality of the video image presented and the audio reproduction provided by these small devices.

The present invention addresses the aforementioned limitations of the prior art by providing for the integration of a personal media player with a portable DVD/CD player to provide a higher quality audio output, as well as a larger and improved video image than that available on the personal media player. The portable DVD/CD player is provided with a docking system for receiving, and electrical connection to, the personal media player, with the personal media player's received and stored audio and video programming and files available for playing on the portable DVD/CD player.

OBJECTS AND SUMMARY OF THE INVENTION

Accordingly, it is an object of the present invention to provide an improved portable personal video and audio media player which allows for the playing and storing of video and audio programming in real time.

It is another object of the present invention to provide an integrated personal media player and a portable DVD/CD player capable of playing and/or storing data files received by or stored in the media player on the portable DVD/CD player.

A further object of the present invention is to provide a connection arrangement between a portable DVD/CD player and a personal media player capable of receiving and storing audio and video programming which can be played on the DVD/CD player in real time or stored therein for subsequent viewing or listening.

A still further object of the present invention is to provide improved video imagery and audio fidelity of digital video and audio files received by or stored in a personal media player to a portable DVD/CD player for the enjoyment of one or more viewers/listeners.

The present invention contemplates a portable multimedia player comprising: a portable DVD/CD player for reproducing and displaying video signals and for reproducing and transmitting audio signals; a personal media player capable of receiving and storing audio and video data; and a docking station electrically coupled to said portable DVD/CD player and adapted for receiving and electrical coupling to said personal media player for providing audio and video data received by or stored in said personal media player to said portable DVD/CD player for transmission by and display on said portable DVD/CD player.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 1 is an upper perspective view of an integrated personal media player (PMP) and portable DVD/CD player in accordance with the principles of the present invention;

FIG. 2 is a side elevation view of the integrated PMP and DVD/CD player shown in FIG. 1 with the video display lid shown in the closed position;

FIG. 3 is a perspective view of another embodiment of an integrated PMP and DVD/CD player in accordance with the present invention illustrating a protective cover for a PMP connected to the portable DVD/CD player in accordance with one embodiment of the present invention;

FIG. 4 is a top plan view of another embodiment of an integrated PMP and DVD/CD player in accordance with the present invention showing the PMP installed in and connected to the portable DVD/CD player;

FIG. 5 is a side elevation view shown partially in phantom of the integrated PMP and DVD/CD player shown in FIG. 4 illustrating additional details of the invention;

FIG. 7 is a block diagram illustrating the functional components of a personal media player and a docking station for connecting the personal media player to a portable DVD/CD player in accordance with one embodiment of the present invention.

DETAILED DESCRIPTION OF THE PREFERRED EMBODIMENTS

Figure 6:
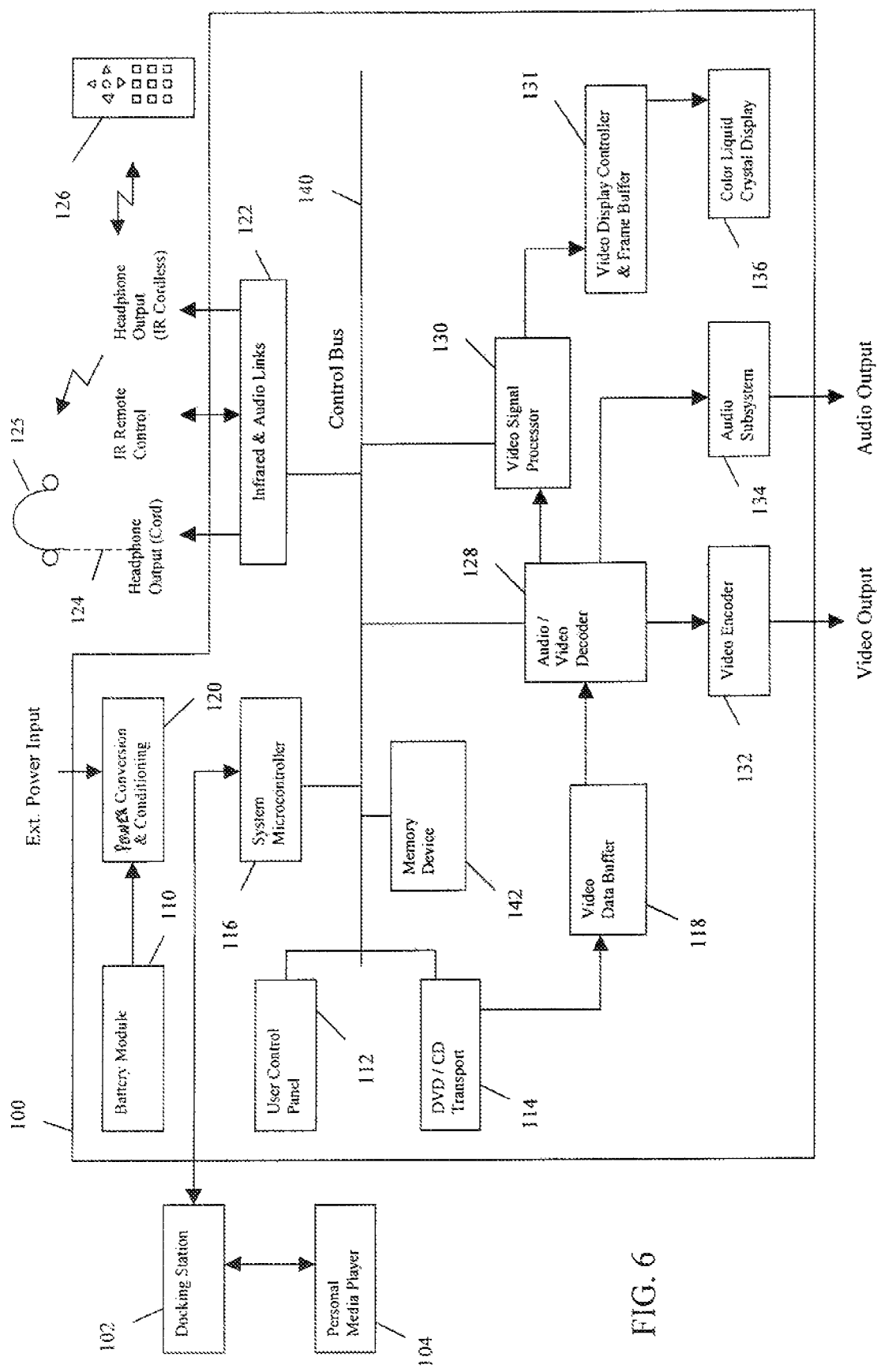
FIG. 6 is a block diagram illustrating the functional components of a portable DVD/CD player integrated with a personal media player in accordance with the present invention.

Referring to FIG. 1, there is shown an upper perspective view of an integrated personal media player (PMP) and portable DVD/CD player 10 in accordance with the principles of the present invention. A side elevation view of the portable integrated PMP/DVD/CD player 10 of FIG. 1 is shown in the closed configuration in FIG. 2. The PMP/DVD/CD player 10 includes a base 12 pivotally coupled to which by means of first and second hinges 16a and 16b is a lid 14 including a video display 18. Various video displays may be used in the integrated PMP/DVD/CD player 10, with a liquid crystal diode (LCD) display frequently used in these types of devices. Also disposed in the lid 14 of the integrated PMP/DVD/CD player 10 are first and second audio speakers 20a and 20b.

Lid 14 of the integrated PMP/DVD/CD player 10 is shown in the open position in FIG. 1 to expose the upper surface of the integrated PMP/DVD/CD player's base 12. Disposed on the upper surface of base 12 is a conventional arrangement of user controls 40 to allow a user of the portable multimedia player to select one of the various modes of operation and to control the operating parameters of the selected mode. These user controls 40 include a video deactivation selector 52 to allow a user to turn off video display 18 when the PMP/DVD/CD player 10 is playing an audio CD or is transmitting only an audio signal from a personal media player. This extends the life of the video display 18 and reduces the power required to operate the integrated PMP/DVD/CD player 10. Disposed on a lateral surface of the PMP/DVD/CD player's base 12 is a disc-receiving slot 28 which is adapted to receive either a DVD 30 or a smaller CD. Disposed within the PMP/DVD/CD player's base 12 is a combination DVD/CD drive, or transport, mechanism which is disposed adjacent the disc-receiving slot 28 and is not shown in the figure for simplicity. Also disposed in a lateral surface of the PMP/DVD/CD player's base 12 are plural memory receiving slots 42, each adapted to receive a respective memory chip for either downloading and playing what is stored on a given chip, or for recording received video and/or audio data on a given memory chip. Memory chips inserted in the memory-receiving slots 42 may take on various forms, with one of the more common memories used in these types of devices being a flash memory chip. Disposed on another lateral surface of the PMP/DVD/CD player's base 12 is a power input jack 32, an S-video plug 34, and video/audio/earphone jacks 36. Also disposed in the PMP/DVD/CD player's base 12 is a Universal Serial Bus (USB) port 37 for interfacing with a variety of portable devices made by various manufacturers. Other types of electrical connectors for connecting the PMP/DVD/CD player 10 to various other peripherals or external devices may be included in either lid 14 or base 12 of the PMP/DVD/CD player 10.

Also disposed on the upper surface of the PMP/DVD/CD player's base 12 is a recessed portion 46 which serves as a cradle for receiving and holding a personal media player which is not shown in FIG. 1 for simplicity. Also disposed on the PMP/DVD/CD player's base 12 is a sliding transparent protective cover 50 which is movable between an open position and a closed position as shown in FIG. 1 wherein the cover is disposed over the recessed portion 46 in base 12. Disposed within the recessed portion 46 is a docking station 44 which is adapted to receive a personal media player and to maintain the personal media player securely in position within the recessed portion 46 and in electrical connection with the DVD/CD player portion of the PMP/DVD/CD player 10. A conformable liner 74 is shown in the recessed portion 70 of base 72. Conformable liner 74 is preferably affixed to recessed portion 70 by a conventional adhesive for maintaining the conformable liner securely in position. Conformable liner 74 is preferably comprised of deformable material such as "memory foam" and is adapted to receive and engage a personal media player placed in a center portion of the conformable liner. Conformable liner 74 maintains the personal media player securely in position in the recessed portion 70 of base 72 and prevents the personal media player from bouncing around and isolates the personal media player from impact damage. The personal media player may also be securely maintained in fixed position by means of a strap 76 disposed in the base's recessed portion. Strap 76 is shown in dotted line form and preferably is comprised of Velcro. Transparent protective cover 50 is provided with a cut-out portion 48 which allows for user access to the controls of a personal media player connected via docking station 44 to the PMP/DVD/CD player's base 12.

Referring to FIG. 3, there is shown an upper perspective view of another embodiment of an integrated PMP/DVD/CD player 58 in accordance with the principles of the present invention. The embodiment of the integrated PMP/DVD/CD player 58 shown in FIG. 3 differs from the PMP/DVD/CD player 10 shown in FIG. 1 only in the location of the user controls 60 in the PMP/DVD/CD player's base 12 and the manner in which a transparent protective cover 66 is connected to the base. In the embodiment shown in FIG. 3, the transparent cover 66 is pivotally coupled to the upper surface of the PMP/DVD/CD player's base 72 by means of first and second hinges 68a and 68b. Thus, the transparent protective cover 66 is adapted for positioning over a recessed portion 70 in the PMP/DVD/CD player's base 72 and the combination of a PMP docking station 62 and a personal media player (which is not shown in the figure for simplicity) disposed in the recessed portion. The transparent protective cover 66 may be moved to the open position shown in FIG. 3 by pivotally displacing the cover about the first and second hinges 68a and 68b attached to the upper surface of the PMP/DVD/CD player's base 72. As in the previously described embodiment, the transparent protective cover 66 is provided with an aperture 66a to allow for access to the personal media player's controls when the personal media player is positioned within the recessed portion 70 of base 72 and is connected to docking station 62. This embodiment also includes a conformable liner 78.

Referring to FIG. 4, there is shown a top plan view of an integrated PMP/DVD/CD player 80 with its lid 83 in the open position to illustrate the manner in which a personal media player 86 is integrated with a DVD/CD player 87 in accordance with the principles of the present invention. A side elevation view shown partially in phantom of the PMP/DVD/CD player 80 of FIG. 4 is illustrated on FIG. 5. As in the previously described embodiment, the integrated PMP/DVD/

CD player 80 includes a base 81 to which is pivotally connected a lid 83 containing a video display which is not shown in the figure for simplicity. Disposed on the upper surface of the PMP/DVD/CD player's base 81 is a recessed portion 82 which serves as a cradle for a personal media player 86 disposed therein. Personal media player 86 includes a user control/selector arrangement 88 such as of the touch-sensitive scroll wheel type and a video display 95. Disposed over the recessed portion 82 in base 81 is a transparent protective cover 90. Adjacent one lateral edge of the transparent protective cover 90 is a flange 92 adapted for engagement by the user for moving the transparent protective cover 90 between a closed position, as shown in FIG. 4, and an open position wherein the transparent protective cover is displaced laterally from the recessed portion 82. As in the embodiment of applicant's invention shown in FIG. 1 and described above, transparent protective cover 90 in the embodiment shown in FIG. 4 is slidable between the closed position, shown in FIG. 4, and an open position wherein the transparent protective cover is displaced from the recessed portion 82 so as to permit insertion in or removal from the recessed portion of personal media player 86. Shown in dotted line form in the lateral sectional view of FIG. 5 is an arrangement for facilitating sliding displacement of the transparent protective cover 90 within the upper surface of the PMP/DVD/CD player's base 81. Disposed adjacent opposed lateral edges of the transparent protective cover 90 are first and second slots 93a and 93b, each of which is adapted to receive a respective opposed edge of the transparent protective cover. The transparent protective cover 90 is adapted for sliding engagement with the first and second slots 93a and 93b allowing the transparent protective cover to be moved in the directions of arrow 98 between a retracted position wherein the transparent protective cover is displaced from the recessed portion 82 and a closed position wherein the transparent protective cover is displaced over the recessed portion and a personal media player 86 disposed within the recessed portion. A conformable liner 99 is disposed within recessed portion 82 as in the previously described embodiments.

Also shown in the enlarged portion of FIG. 4 are details of the docking station 84 disposed within the recessed portion 82 of the PMP/DVD/CD player's base 81. Docking station 84 includes a generally linear, multi-pin connector 94 which is adapted for insertion in a slot 97 (shown in dotted line form) disposed in a lower edge of the personal media player 86. Disposed within the slot 97 in the lower edge of the personal media player 86 is a second generally linear, multi-pin connector 85 (also shown in dotted line form) which is complementary in configuration to and adapted to receive the connector 94 in docking station 84 for establishing electrical connection between the personal media player 86 and the portable DVD/CD player in accordance with the present invention. To establish electrical connection, the personal media player 86 is placed within the recessed portion 82 in the upper surface of the PMP/DVD/CD player's base 81 and is slid downward as viewed in FIG. 4 in the direction of arrows 96a and 96b so as to insert connector 94 in slot 97 in the lower edge of the personal media player 86 to establish electrical contact between the complementary, multi-pin connectors 85 and 94. The personal media player 86 includes a video display 95 and a user control/selector arrangement 88. Disposed within the transparent protective cover 90 is a generally circular aperture 89 which allows for access by a user to the personal media player's control/selector arrangement 88 when the personal media player is disposed within the recessed portion 82 of the PMP/DVD/CD player's base 81.

Referring to FIG. 6, there is shown a block diagram illustrating functional components of a portable DVD/CD player 100 in combination with a docking station 102 and a personal media player 104 in accordance with one embodiment of the present invention. The portable DVD/CD player 100 includes a system microcontroller 116 coupled to the personal media player 104 via a docking station 102 which is described in detail below. System microcontroller 116 is coupled to various internal components within the portable DVD/CD player 100 by means of a control bus 140 on which is transmitted video and audio data as well as control data for executing instructions within the DVD/CD player 100. A DVD/CD transport 114 reads video and audio data from a DVD or audio data from a CD and provides this media data to a video data buffer 118. Video data, which includes decoded, interlaced video data from a DVD, is then provided via the video data buffer 118 to an audio/video decoder 128 for the decoding of MPEG/Dolby digital data. The decoded video information is provided from the audio/video decoder 128 to a video signal processor 130 for deinterlacing of the digital video signal for providing progressively scanned video signals. The progressively scanned video signals are provided from the video signal processor 130 to a video display controller and frame buffer 131 for controlling a color liquid crystal display (LCD) 136 upon which is presented a video image in accordance with the deinterlaced video data. The combination of the audio/video decoder 128, the video signal processor 130 for video signal deinterlacing, and the video display controller and frame buffer 130 are generally referred to as a video digital processing system. The audio/video decoder 128 performs both MPEG-1 and MPEG-2 video decoding, Dolby digital, MPEG (Moving Picture Experts Group), and LPCM audio decoding, as well as audio/video synchronisation. Audio/video decoder 128 further preferably includes a single memory device for data storage and buffering.

The video and audio output of the audio/video decoder 128 is provided to a video encoder 132 and thence to a video output jack for presentation on or storage in an accessory device which is not shown in the figure for simplicity. Similarly, the audio output of the audio/video decoder 128 is provided to an audio subsystem 134 and then to an audio output jack for playing on or storage in an audio accessory player, which is also not shown in the figure for simplicity.

The video signal processor 130 not only deinterlaces the digital video from a DVD to provide progressively-scanned video signals, but also preferably corrects brightness, contrast, and color temperature for the presentation of clear and accurate video images with high definition. Video signal processor 130 also preferably converts the video image from rectangular to square pixels and scales the video for full-screen display on the color LCD 136.

The audio subsystem 134 decodes the Dolby digital data screen provided from the audio/video decoder 128, mixes higher number channels down to two channels to provide a conventional stereo output, and encodes/processes the higher number of channels for specialized purposes such as for use as a surround headphone audio output.

System controller 116 is preferably a single-chip microprocessor handling most, if not all, system control functions. Thus, system microcontroller 116 preferably initiates system start-up and provides system configuration, processes user inputs entered via a user control panel 112 and controls feature set selection, the drive operation of the DVD/CD transport 114, the operation of the audio/video decoder 128, the video and audio digital processing system, and the video display controller and frame buffer 131. The portable DVD/CD player 100 may also include a memory device 142 such as a hard drive for storing video and/or audio digital data for playback on, or storage in, the personal media player 104. Memory device 142 may be connected to system controller 116 via control bus 140.

The color LCD 136 is on the order of 10"-12" in size, of either the active or passive matrix type, with a high output fluorescent backlight. The color LCD 136 also preferably has at least a 640×480 pixel resolution with an 18-bit color mapping function. Video display controller and frame buffer 131 provides high resolution onscreen graphics with full-screen video playback and LCD drivers for direct connection to the color LCD display 136 which may be of the high definition type.

The portable DVD/CD player 100 further includes a battery module 110 which is replaceable and rechargeable and which provides high power density at low cost based upon known technology such as NiMH. Battery module 110 preferably employs standard off-the-shelf battery cells having at least a 40 watt-hour capacity for providing in excess of 2.5 hours of continuous operation. The output of the battery module 110 is provided to a power conversion and conditioning circuit 120 for powering the portable DVD/CD player 100. The power conversion and conditioning circuit 120 is also connected to an external power input for driving the portable DVD/CD player 110 by an external power source via a conventional electrical outlet. A charger (not shown) is used to re-charge the internal rechargeable battery within the unit's battery module 110.

The system software of the portable DVD/CD player 100 is stored in the system microcontroller 116 and consists of high-level user interface software and low-level device control software. The software used for operating the portable DVD/CD player 100 is preferably stored in a read-only-memory (ROM) located in the system microcontroller 116. The low-level software interfaces directly with the various hardware components of the portable DVD/CD player 100 and interacts with them at a register level. The low-level software provides such functions as power-on and initialization, configuration of the hardware components, basic device control and synchronization, and interface to the user interface software.

Infrared and audio links 122 are also coupled to the control bus 140 and are controlled by the system microcontroller 116. The infrared and audio links 122 are in the form of one or more integrated circuit chips for decoding the Dolby digital data stream from the audio/video decoder 128, mixing the higher channels down to two channels for a conventional stereo output, and encoding/processing the higher channels for providing a surround headphone output in combination with serial digital-to-analog converters (not shown). Thus, the output of the infrared audio links 122 is provided to stereo headphones 125 via a cord 124 (shown in dotted line form) or to the headphones via an infrared (IR) remote control link from the infrared and audio links 122. Finally, remote control of the portable DVD/CD player 100 is provided by a hand held remote control unit 126 via another IR link to the infrared and audio links 122.

Referring to FIG. 7, there is shown a block diagram illustrating the functional components of and the connection between the docking station 102 and the personal media player 104 in accordance with one embodiment of the present invention. The personal media player 104 includes a central processor unit 164 for controlling the reception and manipulation of input and output data between the personal media player 104 and other systems with which it interfaces. Central processor unit 164 also stores video and audio data received by the personal media player 104 as well as software instructions for controlling the operation of the personal media player.

Coupled to the central processor unit 164 is a user interface 152 which may include a display for visually displaying the music and video lists of programs available or data stored in the memory of the central processor unit 164 or in a program storage block 154. User interface 152 also typically includes a touch pad or buttons for allowing a user to select video or music data to be played or stored or for reviewing and/or customizing the video program and music list stored in the unit's memory such as for facilitating review of these lists and the making of changes or selections thereto. User interface 152 also permits a user to select an operational function as well as to change the reception frequency of the personal media player 104. The program storage block 154 coupled to the central processor unit 164 is configured to store audio and video programs for controlling the distribution of audio and video in the personal media player 104. The audio program may include music lists associated with music also stored in the program storage block 154. Similarly, program storage block 154 may contain video lists associated with video programs stored in the program storage block 154. The video and music may be accessed through the user interface 152 operatively coupled to the central processor unit 164. In general, the program storage block 154 provides a place to hold data that is being used by the personal media player 104 and typically includes a Read-Only-Memory (ROM), a Random-Access-Memory (RAM), a hard disc drive, and a flash memory or similar memory device. The RAM is used by the central processor unit 164 as a general storage area and as a scratch-pad memory, and can also be used to store input data and processed data, of both video and audio type. The ROM is used to store instructions or program code followed by the central processor unit 164, as well as other data. Hard disc drives are used to store various types of data and permit fast access to large amounts of stored data. Computer code and data may also reside on a removable program memory (not shown for simplicity) which is loaded or installed in the personal media player 104 for use as needed.

A power supply circuit 156 also coupled to the central processor unit 164 can be powered by batteries 158 or may be electrically connected by means of a power supply socket 160 to an external power source.

Coupled to and energized by the central processor unit 164 are audio speakers 162 and a video display 166. Video display 166 presents a video image in accordance with a received RF signal or in accordance with video data stored in the central processor unit 164 or in the program storage block 154. Also presented on video display 166 is operation-related information including the tuned-to radio frequency, which is typically in the form of either an LCD or a light emitting diode (LED) monitor. Audio speakers 162 are built into the personal media player 104, but external speakers may also be driven by the personal media player as described below.

Video and audio outputs from the central processor unit 164 are provided to an input/output controller 168. While the central processor unit 164 and the I/O controller 168 are shown in FIG. 3 as separate components, they may equally as well be integrated with one another as a single component. The I/O controller 168 is configured to control interactions of the personal media player 104 with one or more media devices that can be coupled to the personal media player. Thus, the I/O controller 168 is coupled to and provides data to a data socket 170, an audio source output socket 172, and a video source output socket 174. The I/O controller 168 generally operates by exchanging data and/or power between the personal media player 104 and various media devices that desire to communicate with the personal media player. In some cases, these various media devices may be connected to the I/O controller 168 through wired connections and in other cases the media devices may be connected to the I/O controller through wireless connections. In the illustrated embodiment, the docking station 102 used for interfacing the personal media player 104 with other media devices is shown hardwired to the personal media player.

Electrically connected to the personal media player 104 is the docking station 102. As previously described, docking station 102 is integrally formed with the housing of the portable DVD/CD player 194 and is electrically connected to the various components of the portable DVD/CD player. Docking station 102 includes a recessed portion, or holding cavity, for receiving the personal media player 104. Docking station 102 further includes a data plug 190 disposed in the recessed portion for connection to the personal media player's data socket 170. Docking station 102 also includes a data socket 192 electrically connected to the data plug 190 for providing video and audio data to a portable DVD/CD player 194. Docking station 102 further includes a power supply plug 184 for providing power from an external power supply 188 via a power supply socket 186 to the personal media player 104 when connected to the docking station. The combination of the power supply plug 184 and power supply socket 186 within the docking station 102 may also be used to provide power from the portable DVD/CD player 194 to the personal media player 104 by switching from the external power supply 188 to the portable DVD/CD player's internal battery power supply which is not shown in the figure for simplicity. The recessed portion of the docking station 102 further includes an audio plug 198 for connection to the personal media player's audio source output socket 172. Audio plug 198 is further coupled to an audio source output socket 202 within the docking station 102. The audio source output socket 202 is adapted for connection to user earphones 196 to permit the audio output of the personal media player 104 to provide the earphones with user selected music data. Similarly, a video plug 200 disposed within the docking station 102 is adapted for coupling to the video source output socket 174 of the personal media player 104. The video plug 200 is further coupled to a video source output socket 204 within the docking station 102 for providing video data to the portable DVD/CD player 194.

The personal media player 104 includes a multi-pin connector 176 adapted for connecting to a corresponding multi-pin connector 178 disposed on the docking station 102. The docking station 102 is operatively coupled to the portable DVD/CD player 194 through transfer circuitry which may provide a direct or indirect link to the portable DVD/CD player. This transfer circuitry may be hard wired to the portable DVD/CD player 194, such as where the docking station 102 is integrated with the portable DVD/CD player as in the embodiment described herein. The docking station 102 may also be passively wired to the portable DVD/CD player 194 such as by means of a cord that temporarily plugs into the portable DVD/CD player in another embodiment which is not shown in the figures, but is also contemplated and covered by the present invention.

The connection arrangement between the personal media player 104 and the docking station 102 which makes use of multi-pin connectors 176 and 178 includes both power and data contacts. The power contacts of the portable DVD/CD player 194 are operatively coupled to the personal media player's power supply circuit 156 via docking station's power supply plug 184 and the data contacts of the portable DVD/ CD player are operatively coupled to the personal media player's I/O controller 168 via the docking station's data plug 190 and data socket 192. The power contacts of the personal media player's connector 176 are configured so as to engage the power contacts of the docking station's connector 178 so as to provide operational or charging power to the personal media player 104. The data contacts of the personal media player's connector 176 are configured to engage the data contacts of the docking station's connector 178 so as to provide data transmission to and from the personal media player 104. The data contacts may be configured to provide one or more data transmitting functions such as Firewire, USB, USB2.0, Ethernet, and other functions. The personal media player and docking station connectors 176 and 178 may also include various other contacts for transmitting other types of data such as, for example: remote control, video (in/out), audio (in/out), analog TV, and the like.

The present invention may be implemented in various forms of hardware, software, firmware, special purpose processors, or a combination thereof. The present invention is implemented as a combination of both hardware and software which is typically in the form of an application program disposed in a program storage device. The software application program maybe uploaded to, and executed by, a machine comprised of any suitable architecture. The machine may be implemented on a computer platform having hardware such as one or more central processing units, a random access memory, and input/output interfaces. The computer platform may also include an operating system and microinstruction code. The various processes and functions described herein can be stored in either microinstruction code or as part of an application program (or a combination thereof) executed by the operating system. Various peripheral devices may be connected to the computer platform such as an additional data storage device.

Because some of the constituent system components depicted in the accompanying figures and described above may be implemented in software, it is to be understood that the actual connections between the system components may differ from what is described above depending on the manner in which the present invention is programmed. The teachings herein would allow one of ordinary skill in the related arts to contemplate and understand these and similar alternative implementations and configurations of the present invention.

While particular embodiments of the present invention have been shown and described, it will be obvious to those skilled in the relevant arts that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. A portable multimedia player comprising:
a portable DVD/CD player for reproducing and displaying video signals and for reproducing and transmitting audio signals, said portable DVD/CD player including a housing having a recessed portion adapted to receive a personal media player, wherein said recessed portion is formed integrally with said housing, and wherein said recessed portion is disposed in an upper surface of said housing;

a personal media player capable of receiving and storing audio and video data, said personal media player including a first electrical connector for transmitting received and stored audio and video data in said personal media player, wherein said personal media player is disposed below the housing's upper surface when positioned in said recessed portion, said personal media player including user responsive control input means and said protective cover includes an aperture therein to allow for access to said control input means by a user when said personal media player is disposed in said recessed portion under said protective cover;

a docking station attached to an outer portion of said housing and disposed within the recessed portion of said housing and electrically coupled to said portable DVD/CD player and adapted for receiving and electrical coupling to said personal media player for providing audio and video data received by or stored in said personal media player to said portable DVD/CD player for transmission by and display on said portable DVD/CD player, said docking station including a second electrical connector adapted for connection to said electrical connector for display and transmission of the video and audio data in said personal media player on said portable DVD/CD player; and a protective cover comprised of transparent plastic and attached to said housing and movable between a first position wherein said protective cover is disposed over the recessed portion of said housing for protecting said personal media player and said docking station and a second position displaced from said recessed portion to allow the personal media player to be placed in or removed from said recessed portion.

2. The portable multimedia player of claim 1 further comprising hinge means for pivotally coupling said protective cover to said housing.

3. The portable multimedia player of claim 1 further comprising plural spaced slots disposed in said housing adjacent the recessed portion thereof for engaging said protective cover and for permitting sliding displacement of said protective cover between said first and said second positions.

4. The portable multimedia player of claim 1 further comprising restraining means disposed in the recessed portion of said housing for engaging and maintaining said personal media player in fixed position in the recessed portion of said housing.

5. The portable multimedia player of claim 4 wherein said restraining means is a conformable liner adapted for assuming the shape, configuration and size of said personal media player when placed in contact with said personal media player.

6. The portable multimedia player of claim 5 wherein said conformable liner is comprised of memory foam.

7. The portable multimedia player of claim 4 wherein said restraining means is a strap engaging said personal media player.

8. The portable multimedia player of claim 1 wherein said portable DVD/CD player includes a memory device for storing digital audio and video data and for downloading said digital audio and video data to said personal media player for transmission and display thereon.

9. The portable multimedia player of claim 1 further comprising a remote controller including user input means for allowing the control of said portable DVD/CD player and said personal media player by a remotely located user.

* * * * *